(12) United States Patent
Hanaoka (10) Patent No.: US 12,019,356 B2
(45) Date of Patent: Jun. 25, 2024

(54) LENS BARREL AND INTERCHANGEABLE LENS CAMERA

(71) Applicant: NITTOH INC., Nagano (JP)

(72) Inventor: Takafumi Hanaoka, Nagano (JP)

(73) Assignee: NITTOH INC., Nagano (JP)

( * ) Notice: Subject to any disclaimer, the term of this patent is extended or adjusted under 35 U.S.C. 154(b) by 719 days.

(21) Appl. No.: 15/734,995

(22) PCT Filed: May 28, 2019

(86) PCT No.: PCT/JP2019/021062
§ 371 (c)(1),
(2) Date: Dec. 4, 2020

(87) PCT Pub. No.: WO2019/235296
PCT Pub. Date: Dec. 12, 2019

(65) Prior Publication Data
US 2021/0232022 A1  Jul. 29, 2021

(30) Foreign Application Priority Data
Jun. 8, 2018  (JP) .................. 2018-110319

(51) Int. Cl.
*G03B 17/14* (2021.01)
*G02B 7/02* (2021.01)

(52) U.S. Cl.
CPC ............. *G03B 17/14* (2013.01); *G02B 7/021* (2013.01); *G02B 7/023* (2013.01)

(58) Field of Classification Search
CPC ......... G03B 17/14; G02B 7/021; G02B 7/023
USPC ............... 359/827, 822, 824, 825, 826, 830
See application file for complete search history.

(56) References Cited

U.S. PATENT DOCUMENTS

| | | | |
|---|---|---|---|
| 4,999,656 A * | 3/1991 | Shimizu | H01R 12/62 396/89 |
| 5,079,577 A | 1/1992 | Nomura | |
| 6,259,571 B1 * | 7/2001 | Holderer | G02B 7/026 359/822 |
| 7,302,175 B2 | 11/2007 | Tsuji | |
| 7,978,250 B2 | 7/2011 | Miyoshi | |
| 8,734,032 B2 | 5/2014 | Hase | |

(Continued)

FOREIGN PATENT DOCUMENTS

| | | |
|---|---|---|
| CN | 1702486 A | 11/2005 |
| CN | 1975493 A | 6/2007 |

(Continued)

*Primary Examiner* — Sharrief I Broome
(74) *Attorney, Agent, or Firm* — HAUPTMAN HAM, LLP (57) ABSTRACT

A lens barrel is provided with: a stationary barrel having a large-diameter section and a recessed section which is recessed further toward the inner diameter side than the large-diameter section; a printed circuit board which is mounted so that at least part thereof is disposed along the outer peripheral surface of the stationary barrel; movable barrels positioned further toward the outer diameter side than the stationary barrel and moving relative to the stationary barrel; and a cable member having flexibility which allows the cable member to deform flexibly, the cable member being provided with a mounting section which is mounted on the printed circuit board, and also with a passage section which passes between the printed circuit board and the stationary barrels.

8 Claims, 7 Drawing Sheets

(56) References Cited

U.S. PATENT DOCUMENTS

| | | | |
|---|---|---|---|
| 2005/0265716 A1* | 12/2005 | Tsuji | G03B 9/08 |
| | | | 396/542 |
| 2008/0044175 A1* | 2/2008 | Ilkawa | H05K 1/028 |
| | | | 396/542 |
| 2009/0040369 A1 | 2/2009 | Miyoshi | |
| 2013/0195438 A1 | 8/2013 | Hase | |
| 2016/0259227 A1* | 9/2016 | Sugiyama | G03B 17/14 |

FOREIGN PATENT DOCUMENTS

| | | |
|---|---|---|
| CN | 101363951 A | 2/2009 |
| CN | 103226230 A | 7/2013 |
| JP | S57100730 U | 6/1982 |
| JP | S663113107 U | 7/1988 |
| JP | H594811 U | 12/1993 |
| JP | H784168 A | 3/1995 |
| JP | 2508107 Y2 | 8/1996 |
| JP | 2008122541 A | 5/2008 |
| JP | 201337304 A | 2/2013 |

* cited by examiner

LENS BARREL AND INTERCHANGEABLE LENS CAMERA

CROSS REFERENCE TO RELATED APPLICATIONS

This is a U.S. national stage of application No. PCT/JP2019/021062, filed on May 28, 2019. Priority under 35 U.S.C. § 119(a) and 35 U.S.C. § 365(b) is claimed from Japanese Patent Applications No. 2018-110319 filed on Jun. 8, 2018.

TECHNICAL FIELD

The present invention relates to a lens barrel and an interchangeable lens camera.

BACKGROUND ART

Among lens barrels provided to cameras, there is one having a flexible printed circuit board having flexibility built therein, as an electric wire, as described in Patent Literature 1, for example. In a configuration disclosed in Patent Literature 1, a shutter holding frame (13b) is provided to a front group lens barrel (13). This shutter holding frame (13b) is provided with a recess (22) having a width corresponding to that of a flexible printed circuit board (20), in which a mounting base (23) is provided to one end of the recess (22), and a support projection (24) is provided to the other end of the recess (22). A pressing member (21) is supported by these mounting base (23) and support projection (24).

Further, the above-described flexible printed circuit board (20) is sandwiched at a sandwiching part between the pressing member (21) and a periphery of the recess (22). Consequently, the flexible printed circuit board (20) can be held in a state of being brought into close contact with a peripheral surface of a shutter unit (16) with no need of adhesive tape or adhesive.

CITATION LIST

Patent Literature

{PTL 1} Japanese Utility Model Registration Publication No. 2508107

SUMMARY OF INVENTION

Technical Problem

Incidentally, in the configuration disclosed in Patent Literature 1, the pressing member (21) is necessary to sandwich the flexible printed circuit board (20) at the aforementioned sandwiching part. For this reason, there is a problem that the number of parts increases by the amount that the pressing member (21) and a fixing screw (25) are required.

Further, in the configuration disclosed in Patent Literature 1, a control circuit (27) is provided to a camera body side being outside of the lens barrel. Therefore, there is no disclosure at all regarding how the flexible printed circuit board (20) is disposed in a flexible printed circuit board built-in type lens barrel in which the flexible printed circuit board such as the control circuit (27) is provided inside the lens barrel. For this reason, it is unknown how the cable member such as the flexible printed circuit board (20) is arranged in the lens barrel with a built-in flexible printed circuit board in a state where it does not slide with respect to a moving cylinder such as a rotating cylinder.

Just for reference, in the configuration disclosed in Patent Literature 1, the flexible printed circuit board (20) passes through a narrow gap part when it goes from the aforementioned sandwiching part toward the control circuit (27) on the outside of the lens barrel, but, such a configuration makes it impossible to perform interchange of the lens barrel from the camera body.

Further, in the configuration disclosed in Patent Literature 1, since the control circuit (27) is provided further on an outer diameter side than a stationary barrel (11), the flexible printed circuit board (20) is guided to go toward the outer diameter side when it goes from the aforementioned sandwiching part to the control circuit (27) on the outside of the lens barrel. However, when the flexible printed circuit board (20) is guided from the inner side to the outer diameter side of the lens barrel, a route of guiding the flexible printed circuit board (20) becomes complicated.

Further, when the flexible printed circuit board (20) goes from the inside to the outer diameter side of the lens barrel, it is likely to slide with a rotating part or a straight-moving part of the lens barrel. For preventing such a contact, it is necessary to appropriately manage the length of the flexible printed circuit board (20) in consideration of driving the lens barrel. Otherwise, the surplus portion of the flexible printed circuit board (20) will slide with the rotating portion and the straight-moving portion described above, resulting in disconnection of the flexible printed circuit board (20).

The present invention has been made in consideration of such problems, and an object thereof is to provide a lens barrel and an interchangeable lens camera capable of satisfactorily guiding a cable member with respect to a flexible printed circuit board disposed inside a lens barrel while suppressing an increase in the number of parts.

Solution to Problem

In order to solve the above-described problems, according to a first aspect of the present invention, there is provided a lens barrel being a lens barrel attached to a camera main body, the lens barrel including: a stationary barrel having a large-diameter section and a recessed section which is recessed further toward an inner diameter side than the large-diameter section; a flexible printed circuit board attached so that at least a part thereof is disposed along an outer peripheral surface of the stationary barrel; movable barrels moving relative to the stationary barrel; and a cable member having flexibility which allows to be deformed flexibly, the cable member including a mounting section which is mounted on the printed circuit board, and including a passage section which passes between the printed circuit board and the stationary barrel.

Further, according to another aspect of the present invention, in addition to the above-described invention, it is preferable that the printed circuit board is attached to the recessed section of the stationary barrel.

Further, according to another aspect of the present invention, in addition to the above-described invention, it is preferable that the printed circuit board is attached to the stationary barrel via a connecting member, and the connecting member has a guide recess in a recessed shape through which the passage section of the cable member is passed.

Further, according to another aspect of the present invention, in addition to the above-described invention, it is preferable that the cable member is provided with an inclined section that approaches an outer peripheral surface of the recessed section with proximity to the passage section from the large-diameter section.

Further, according to another aspect of the present invention, in addition to the above-described invention, it is preferable that an outer peripheral surface of the large-diameter section is provided with a guide groove which guides the cable member from the recessed section side toward the large-diameter section side, and a groove disposition section of the cable member is disposed in the guide groove.

Further, according to another aspect of the present invention, in addition to the above-described invention, it is preferable that a pressing barrel is attached to the outer diameter side of the stationary barrel, and the pressing barrel is disposed on the opposite side of the recessed section with respect to the movable barrels, and the cable member is guided to enter the guide groove by the pressing barrel.

Further, according to another aspect of the present invention, in addition to the above-described invention, it is preferable that the large-diameter section is provided on a side distant from the camera main body than the recessed section, a length adjusting section is provided at a portion between the mounting section and the passage section of the cable member, and the length adjusting section gives, to the passage section, biasing force in a direction away from the large-diameter section.

Further, according to another aspect of the present invention, it is preferable to include: the lens barrel according to each of the above-described inventions; and a camera main body to which the lens barrel is attached.

Advantageous Effects of Invention

According to the present invention, it is possible to provide a lens barrel and an interchangeable lens camera capable of satisfactorily guiding a cable member with respect to a printed circuit board disposed inside a lens barrel while suppressing an increase in the number of parts.

DESCRIPTION OF EMBODIMENTS

Hereinafter, a lens barrel and an interchangeable lens camera according to one embodiment of the present invention will be described based on the drawings. Note that in the following description, in an extending direction of an optical axis A1 (X direction) of a lens barrel 10, an object side is defined as a front side (X1 side) and a camera main body 2 side is defined as a rear side (X2 side). Further, a direction orthogonal to the optical axis A1 is defined as a radial direction, a side away from the optical axis A1 is defined as an outer diameter side, and a direction approaching the optical axis A1 is defined as an inner diameter side. Further, a rotational direction around the optical axis A1 is defined as a circumferential direction.

[Regarding Configuration]

Figure 1:
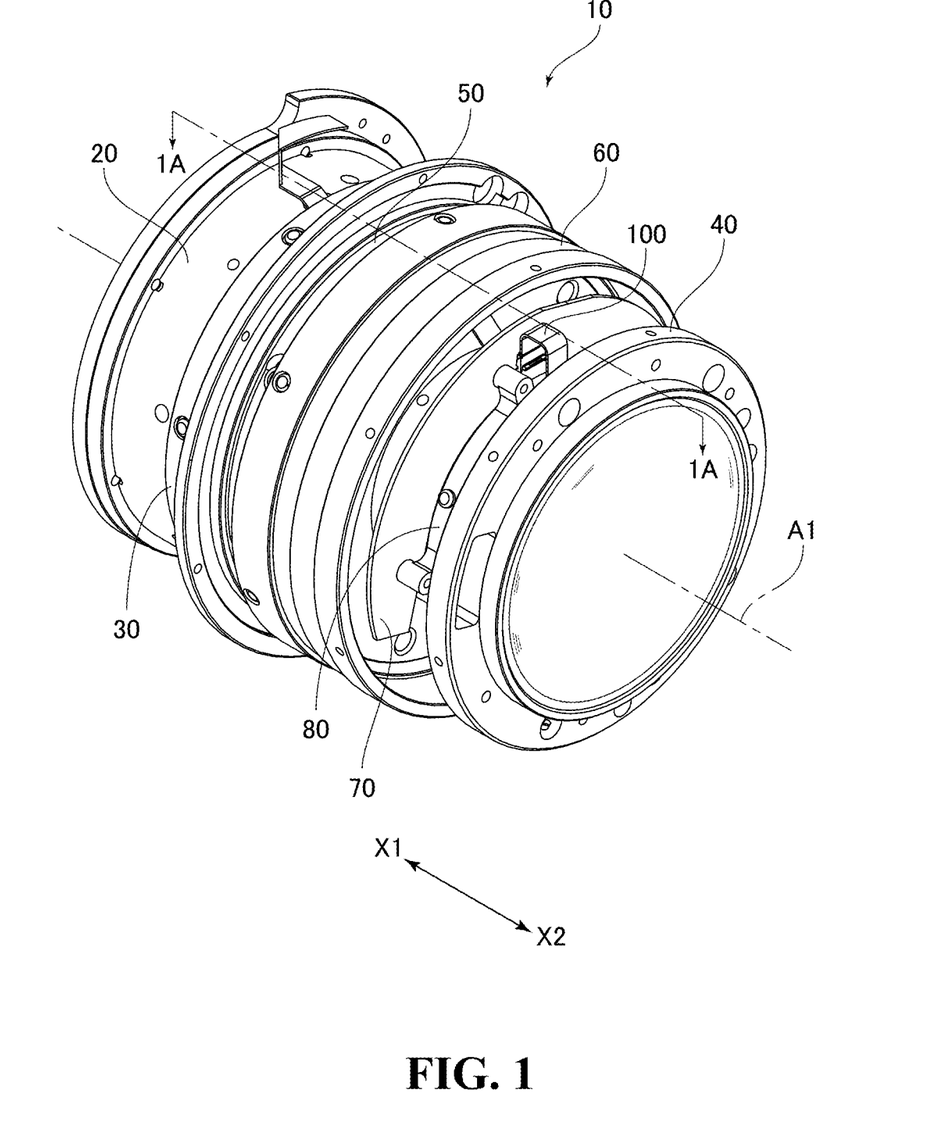
FIG. 1 is a perspective view illustrating a configuration of a lens barrel according to one embodiment of the present invention.
Figure 2:
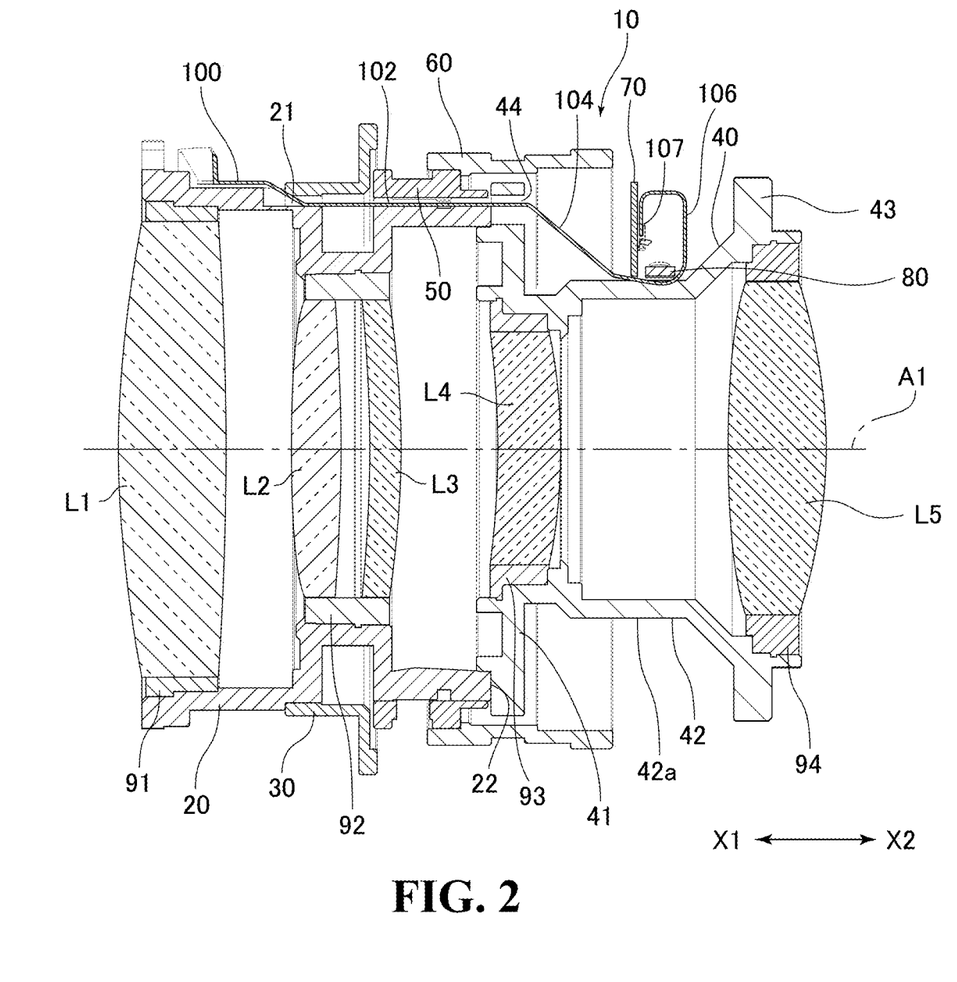
FIG. 2 is a sectional view illustrating a state where the lens barrel illustrated in FIG. 1 is cut along a line 2A-2A.
Figure 3:
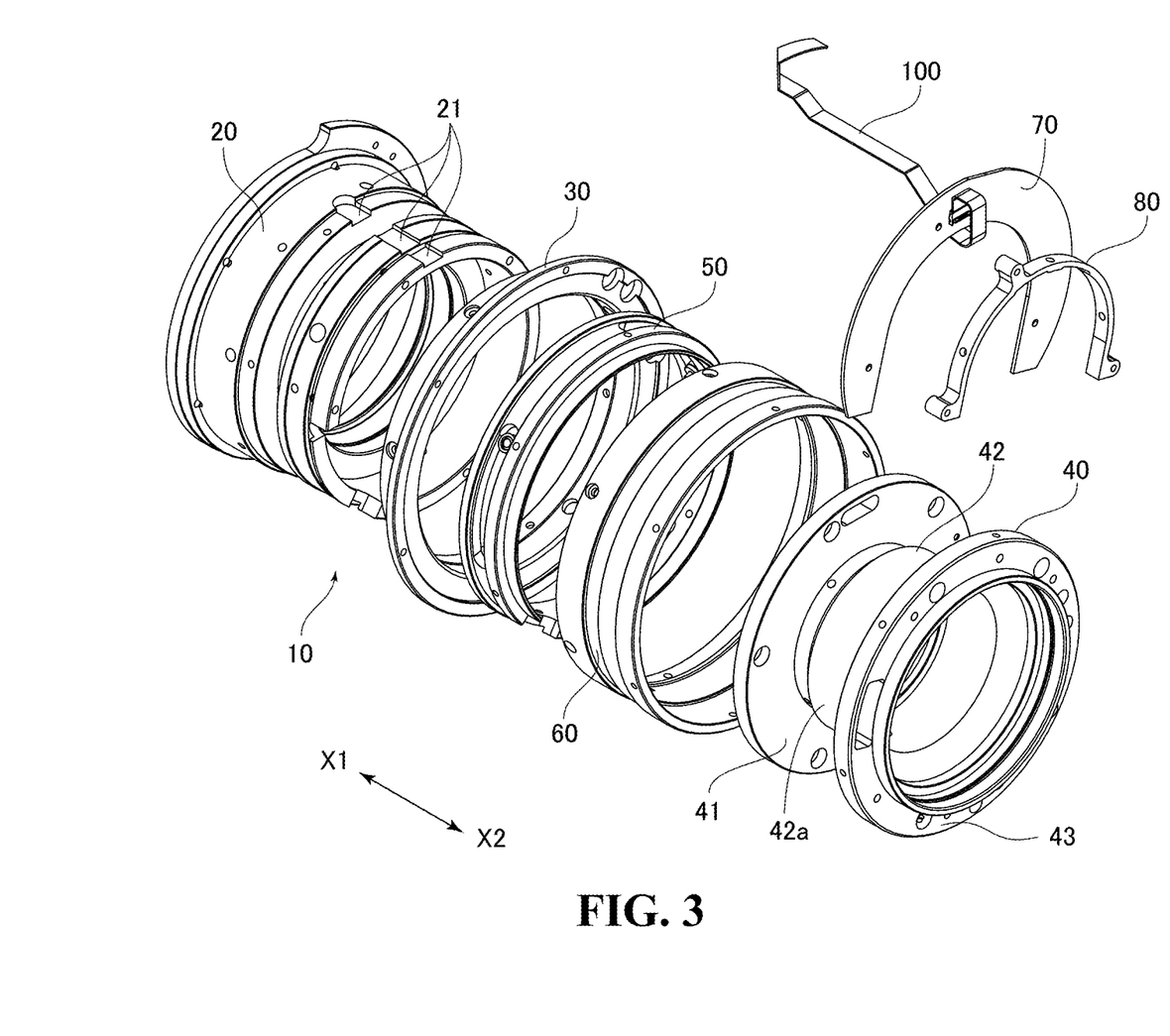
FIG. 3 is an exploded perspective view of the lens barrel illustrated in FIG. 1.

FIG. 1 is a perspective view illustrating a configuration of a lens barrel 10 according to one embodiment of the present invention. FIG. 2 is a sectional view illustrating a state where the lens barrel 10 illustrated in FIG. 1 is cut along a line 1A-1A. FIG. 3 is an exploded perspective view of the lens barrel 10 illustrated in FIG. 1.

As illustrated in FIG. 1 to FIG. 3, the lens barrel 10 includes, as its main constituent elements, an object-side stationary barrel 20, a pressing barrel 30, an image-side stationary barrel 40, a rotary frame 50, a rotary cover 60, a main printed circuit board 70, a connecting member 80, a flexible cable 100, and an auxiliary printed circuit board 110. Further, as illustrated in FIG. 2, to the lens barrel 10, lenses L1 to L5 are attached via lens frames 91 to 94. Note that in the configuration illustrated in FIG. 2, four lens frames 91 to 94 and five lenses L1 to L5 are illustrated, but, the number of the lens frames and the lenses can be appropriately set to one other than the above number, as a matter of course.

The object-side stationary barrel 20 is a cylindrical body positioned on a side far from a camera main body 2 than the image-side stationary barrel 40 to be described later, and it does not rotate with respect to the camera main body 2. Further, the object-side stationary barrel 20 and the image-side stationary barrel 40 are fixed by a screw or the like, and the image-side stationary barrel 40 also does not rotate with respect to the camera main body 2. Note that at least one member of the object-side stationary barrel 20 and the image-side stationary barrel 40 corresponds to a stationary barrel.

Figure 4:
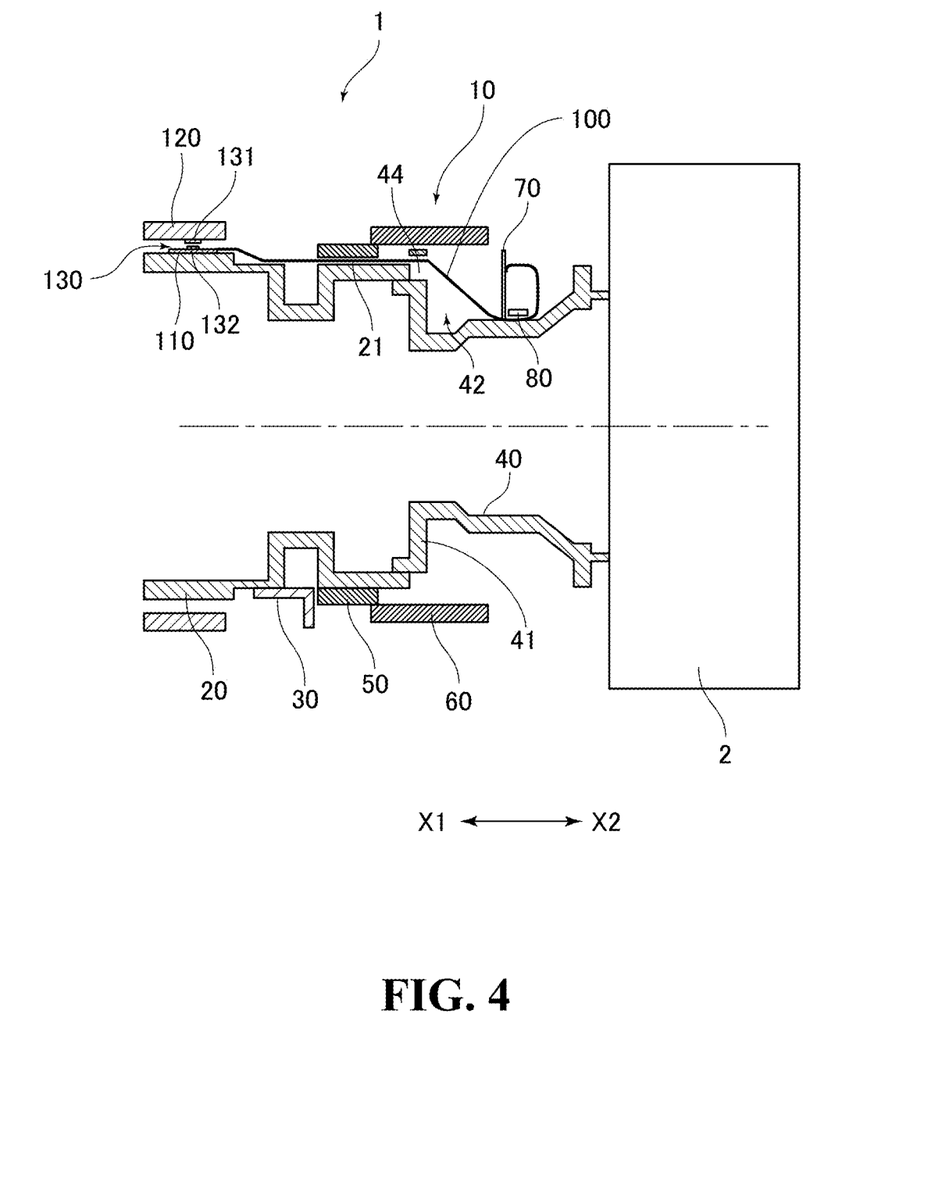
FIG. 4 is a schematic view illustrating an outline of the lens barrel and an interchangeable lens camera according to one embodiment of the present invention.

FIG. 4 is a schematic view illustrating an outline of the lens barrel 10 and an interchangeable lens camera 1 according to one embodiment of the present invention. In this FIG. 4, the illustration of the lenses L1 to L5 and the configuration inside the camera main body 2 is omitted. Note that in the present embodiment, the interchangeable lens camera 1 means one in which the lens barrel 10 is attached to the camera main body 2. As illustrated in FIG. 4, an object-side rotary barrel 120 is disposed on the outer diameter side of the object-side stationary barrel 20. The object-side rotary barrel 120 is a cylindrical body for performing a focusing operation, for example. However, the object-side rotary barrel 120 may also be one that performs an operation other than the focusing operation, such as an aperture operation or a zoom operation.

In order to detect a rotation angle of the object-side rotary barrel 120 as described above, a rotation detecting sensor 130 is disposed between the object-side stationary barrel 20 and the object-side rotary barrel 120. The rotation detecting sensor 130 is, for example, an encoder or the like capable of magnetically detecting a rotation angle, and a rotating-side member 131 (a magnetic disk, a magnet band, or the like) of the rotation detecting sensor 130 rotates in accordance with the rotation of the object-side rotary barrel 120. Further, a stationary-side sensor element 132 of the rotation detecting sensor 130 is mounted on the auxiliary substrate 110. On the auxiliary substrate 110, one end side of the flexible cable 100 is mounted. Therefore, an electrical signal regarding the rotation angle detected by the rotation detecting sensor 130 is transmitted to the main printed circuit board 70 via the flexible cable 100.

The object-side stationary barrel 20 is provided with a guide groove 21 in which the flexible cable 100 is disposed. The guide groove 21 is a recessed portion which is recessed a large diameter portion of an outer circumferential surface of the object-side stationary barrel 20 at a predetermined width, and is formed from the vicinity at which the auxiliary substrate 110 is disposed toward a rear side thereof (X2 side). The flexible cable 100 is disposed in the guide groove 21, and in the following description, a part of the flexible cable 100, the part being arranged in the guide groove 21 is referred to as a groove disposition section 102 (refer to FIG. 2 and FIG. 6).

Note that the groove disposition section 102 is attached to a bottom portion of the guide groove 21 via a fixing means such as a double-sided adhesive tape or an adhesive. A depth of the guide groove 21 is set such that the groove disposition section 102 does not protrude from the guide groove 21 when the groove disposition section 102 is attached to the bottom portion of the guide groove 21 by a fixing means such as double-sided tape or an adhesive. Concretely, in the object-side stationary barrel 20, the depth of the guide groove 21 from the outer peripheral surface on which the guide groove 21 is formed is a dimension as a result of adding a predetermined margin to a total of a thickness of the groove disposition section 102 and a thickness of the fixing means such as the double-sided adhesive tape or the adhesive. This makes it possible to maintain a state where the groove disposition section 102 is not brought into contact with the rotary frame 50 to be described later.

Further, the pressing barrel 30 is disposed on the outer diameter side of the outer peripheral surface of the object-side stationary barrel 20, on which the guide groove 21 is disposed. The pressing barrel 30 is fixed to an appropriate position of the outer peripheral surface of the object-side stationary barrel 20 via a fixing unit such as a screw. The pressing barrel 30 is a member that presses the flexible cable 100 from the outer diameter side so that the flexible cable 100 enters the guide groove 21. Therefore, with proximity to the rear side (X2 side) from the auxiliary substrate 110 along the flexible cable 100, the flexible cable 100 is bent toward the inner diameter side by the pressing barrel 30. Consequently, the groove disposition section 102 of the flexible cable 100 is configured to be positioned in the guide groove 21. By the pressing barrel 30, the flexible cable 100 that goes from the auxiliary substrate 110 toward the rear side (X2 side) is guided in a direction toward the inner diameter side of the object-side stationary barrel 20, therefore, bending of the flexible cable 100 toward the outer diameter side is suppressed, and the flexible cable 100 is prevented from being protruded from the guide groove 21.

In the following description, in the flexible cable 100, a part being bent from the outer peripheral surface of the object-side stationary barrel 20 toward the inner diameter side by the pressing barrel 30, is referred to as a one end-side inclined section 101 (refer to FIG. 2 and FIG. 6). Because of the presence of the one end-side inclined section 101, the groove disposition section 102 is brought into a state of being disposed inside the guide groove 21. Further, even if a not-illustrated movable barrel that rotates or straightly moves along the optical axis A1 is disposed on the outer diameter side of the pressing barrel 30, the groove disposition section 102 is disposed inside the guide groove 21 because of the presence of the one end-side inclined section 101, so that the flexible cable 100 can be prevented from being brought into contact with the aforementioned movable barrel. Further, even if the adhesive peels off and the groove disposition section 102 disposed in the guide groove 21 and facing the pressing barrel 30 protrudes to the outer diameter side from the inside of the guide groove 21, the groove disposition section 102 is prevented from being greatly bent toward the outer diameter side, because the pressing barrel 30 is disposed on the outer diameter side. Further, the one end-side inclined section 101 is pressed from its outer diameter side by the pressing barrel 30. For this reason, by suppressing transmission of repulsive force of the flexible cable 100 toward the outer diameter side, to the groove disposition section 102 facing the pressing barrel 30, the groove disposition section 102 is prevented from peeling off the guide groove 21, where the one end side of the flexible cable 100 is mounted on the auxiliary printed circuit board 110 disposed further on the outer diameter side than the guide groove 21.

To an end face 22 on the rear side (X2 side) of the above-described object-side stationary barrel 20, the image-side stationary barrel 40 is fixed via a fixing means such as a screw, for example. The image-side stationary barrel 40 is also a cylindrical body that does not rotate with respect to the camera main body 2, similarly to the object-side stationary barrel 20. The image-side stationary barrel 40 is provided with an object-side flange section 41, a recessed section 42, and an image-side flange section 43. Note that the image-side stationary barrel 40 is a cylindrical body which is attached to the not-illustrated camera main body 2 side, but, a cylindrical body other than the image-side stationary barrel 40 may also be attached to the camera main body 2 side.

Among the above, the object-side flange section 41 is provided to have a diameter larger than that of the recessed section 42. The object-side flange section 41 is provided with a guide hole 44 formed in the X direction. The guide hole 44 is a hole part that is communicated with the above-described guide groove 21, and the guide hole 44 penetrates the object-side flange section 41. Consequently, the flexible cable 100 can extend from the guide groove 21 to the recessed section 42 side by passing through the guide hole 44. Note that it is also possible to configure such that, not the guide hole 44 that penetrates the object-side flange section 41, but a cutout portion obtained by cutting out the object-side flange section 41 from the outer diameter side toward the inner diameter side of the object-side flange section 41, is formed, and the flexible cable 100 is inserted into the cutout portion. In a case of employing the guide hole 44, even if the flexible cable 100 on the rear side (X2 side) of the guide hole 44 is bent toward the outer diameter side, transmission of an influence of the bending, to the flexible cable 100 on the front side (X1 side) of the guide hole 44, can be suppressed by an inner peripheral surface positioned on the outer diameter side, of the guide hole 44. In the following description, a part of the flexible cable 100 passing through the guide hole 44 is referred to as a guide hole passage section 103 (refer to FIG. 2 and FIG. 6). Further, in the flexible cable 100, a part being bent toward the inner diameter side so as to be directed from the vicinity of the guide hole 44 to an outer peripheral surface 42a of the recessed section 42, is referred to as an inner diameter-side inclined section 104. The inner diameter-side inclined section 104 corresponds to an inclined section. By the inner diameter-side inclined section 104, the flexible cable 100 is directed further toward the inner diameter side than the object-side flange section 41 being a part of the large-diameter section, the flexible cable 100 on the front side (X1 side) of the guide hole 44 can be suppressed from being directed to the outer diameter side due to bending or the like.

Further, the recessed section 42 is a part provided to have a diameter smaller than that of the object-side flange section 41 and the image-side flange section 43. Concretely, the recessed section 42 is recessed more than the object-side flange section 41 and the image-side flange section 43 so that even in a case where the main printed circuit board 70 described later is disposed on the outer diameter side of the recessed section 42, an outer peripheral edge portion of the main printed circuit board 70 is positioned at nearly the same position from a center of the optical axis (nearly the same radial position) of an outer peripheral edge portion of the object-side flange section 41, or the outer peripheral edge portion of the main printed circuit board 70 is positioned further on the inner diameter side than the outer peripheral edge portion of the object-side flange section 41. Note that at least one of the object-side flange section 41 and the image-side flange section 43 corresponds to a large-diameter section. Since the position (distance) of the outer peripheral edge portion of the main printed circuit board 70 from the center of the optical axis is set further on the inner diameter side than the position (distance) of the outer peripheral edge portion of the object-side flange section 41 from the center of the optical axis, it becomes possible to realize size reduction in the radial direction, and there is no need to form a projection or the like corresponding to the main printed circuit board 70, to an outer case.

Further, the rotary frame 50 illustrated in FIG. 1 and FIG. 2 is a cylindrical body capable of rotating with respect to the object-side stationary barrel 20 for operating the aperture, and is disposed on the outer diameter side of the object-side stationary barrel 20. However, the rotary frame 50 may also be one that performs an operation other than the aperture operation, such as a focus operation or a zoom operation. Note that the rotary frame 50 corresponds to a movable barrel.

The rotary frame 50 is disposed on the rear side (X2 side) of the pressing barrel 30, and is provided so as to face a part of the guide groove 21. However, as described above, in the object-side stationary barrel 20, the depth of the guide groove 21 from the outer peripheral surface on which the guide groove 21 is formed is the dimension as a result of adding the predetermined margin to the total of the thickness of the groove disposition section 102 and the thickness of the fixing means such as the double-sided adhesive tape or the adhesive. Therefore, the rotary frame 50 is not brought into contact with the groove disposition section 102 of the flexible cable 100 disposed in the guide groove 21. For this reason, even when the rotary frame 50 rotates, there is created a state where the rotary frame 50 and the groove disposition section 102 do not slide with each other. Since the rotary frame 50 is disposed on the rear side (X2 side) of the pressing barrel 30, the one end-side inclined section 101 and the rotary frame 50 can be separated from each other in the X direction, resulting in that the one end-side inclined section 101 and the rotary frame 50 can be prevented from being brought into contact with each other.

Further, as illustrated in FIG. 1 and FIG. 2, a front side (X1 side) of the rotary cover 60 abuts on a part on the outer diameter side of the rotary frame 50. Further, a rear side (X2 side) of the rotary cover 60 is disposed on the outer diameter side of the object-side flange section 41 and the recessed section 42 in a state where it is not brought into contact with each of the object-side flange section 41 and the recessed section 42, the rear side of the rotary cover 60 is disposed so as to cover the entire outer diameter side of the object-side flange section 41, and disposed so as to cover only a part of the outer diameter side of the recessed section 42. The rotary cover 60 is attached to the rotary frame 50 via a fixing means such as a screw, for example. Therefore, the rotary cover 60 rotates integrally with the rotary frame 50 in accordance with the rotation of the rotary frame 50.

Note that at least one of the rotary frame 50 and the rotary cover 60 corresponds to a movable barrel.

Further, the main printed circuit board 70 (corresponding to a printed circuit board) is disposed on the recessed section 42 of the image-side stationary barrel 40. As illustrated in FIG. 3, the main printed circuit board 70 is provided so as to form a substantially semicircular arc along a shape in a circumferential direction of the outer peripheral surface 42a of the recessed section 42. On a surface on the rear side (X2 side) of the main substrate 70, the other end side of the flexible cable 100 is mounted. In the following description, a part mounted on the main printed circuit board 70, of the flexible cable 100, is referred to as a mounting section 107. Further, in the flexible cable 100, a part that exists between the passage section 105 and the mounting section 107, and that is bent from the passage section 105 toward the outer diameter side, is referred to as a length adjusting section 106 (refer to FIG. 2 and FIG. 6).

Figure 5:
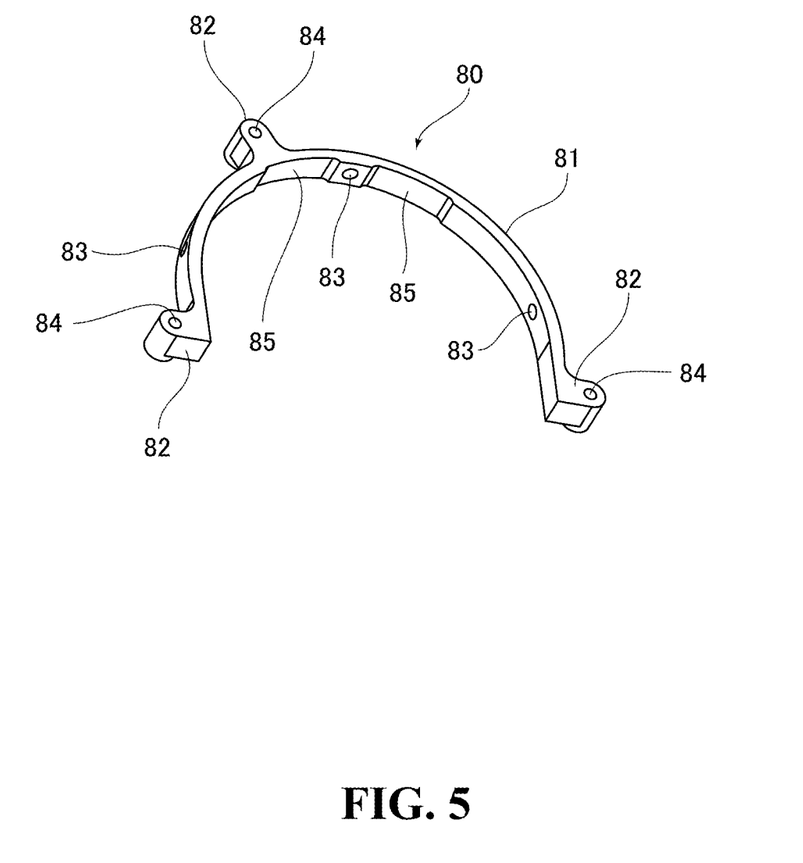
FIG. 5 is a perspective view illustrating a configuration of a connecting member provided to the lens barrel illustrated in FIG. 1.

The above-described main printed circuit board 70 is attached to the recessed section 42 via the connecting member 80. FIG. 5 is a perspective view illustrating a configuration of the connecting member 80. As illustrated in FIG. 5, the connecting member 80 is provided with an arc-shaped part 81, printed circuit board fixing parts 82, attachment holes 83, insertion holes 84, and guide recesses 85. The arc-shaped part 81 is a part provided to form a substantially semicircular arc, similarly to the main printed circuit board 70. However, there is no need to mount the other end side of the flexible cable 100 and the like on the connecting member 80 including the arc-shaped part 81. For this reason, a dimension in the radial direction of the connecting member 80 is set to be smaller than that of the main printed circuit board 70.

To the arc-shaped part 81, the attachment holes 83 are provided so as to be along the radial direction. The attachment holes 83 are hole parts into which fixing means such as a screw are inserted, and the fixing means such as the screw inserted into the attachment hole 83 are screwed in screw holes (not illustrated) which are formed from the outer peripheral surface 42a of the recessed section 42 toward the inner diameter side. Consequently, the connecting member 80 is attached to the recessed section 42.

Further, the printed circuit board fixing part 82 is a part for attaching and fixing the main printed circuit board 70, and is provided so as to protrude from the arc-shaped part 81 to the outer diameter side. To the printed circuit board fixing part 82, the insertion hole 84 is provided so as to be along the optical axis A1 direction. The insertion hole 84 is a hole part into which a fixing means such as a screw is inserted, and the fixing means such as the screw inserted into the insertion hole 84 is screwed in the main printed circuit board 70 or screwed in a fixing means such as a nut disposed on a surface on the front side (X1 side) of the main printed circuit board 70, to thereby fix the main printed circuit board 70 to the connecting member 80. Note that in the configuration illustrated in FIG. 3, three printed circuit board fixing parts 82 (insertion holes 84) and three attachment holes 83 are provided. However, the number of the printed circuit board fixing parts 82 (insertion holes 84) and the attachment holes 83 may be any number.

Note that when the connecting member 80 is attached to the recessed section 42 in a state where the main printed circuit board 70 is fixed to the printed circuit board fixing parts 82, a gap preferably exists in at least a part between the outer peripheral surface of the recessed section 42 and the main printed circuit board 70. Because of the presence of the gap, it becomes possible to prevent interference between the flexible cable 100 that goes from the guide recess 85 toward the guide hole 44 formed in the object-side flange section 41 of the image-side stationary barrel 40, and the main printed circuit board 70. This gap may also be formed by cutting out a part of an end portion on the inner diameter side of the main printed circuit board 70 toward the outer diameter side, similarly to the guide recess 85 of the connecting member 80, and it is also possible to fix the main printed circuit board 70 to the connecting member 80 so that a certain gap is formed between the entire end portion on the inner diameter side of the main printed circuit board 70 and the outer peripheral surface of the recessed section 42.

Further, on an inner peripheral surface side of the arc-shaped part 81, the guide recess 85 is provided. The guide recess 85 is a part at which the flexible cable 100 is positioned, and is a part formed in a manner that the inner peripheral surface of the arc-shaped part 81 is recessed by a predetermined amount from the inner diameter side toward the outer diameter side. Consequently, when the connecting member 80 is fixed to the recessed section 42 by a fixing means such as a screw, it is possible to secure a space through which the flexible cable 100 passes through the inner peripheral surface side of the arc-shape part 81. Concretely, the other end side of the flexible cable 100 extended from the guide hole 44 to the rear side (X2 side), forms the inner diameter-side inclined section 104 that is bent so as to fall on the inner diameter side toward the outer peripheral surface 42a of the recessed section 42. An end portion on the rear side (X2 side) of the inner diameter-side inclined section 104 that comes close to the outer peripheral surface 42a of the recessed section 42 is passed between the main printed circuit board 70 and the outer peripheral surface 42a, and further passed between the guide recess 85 of the connecting member 80 and the outer peripheral surface 42a. The mounting section 107 being the other end side of the flexible cable 100 and an electrical connecting part disposed on a surface on the rear side (X2 side) of the main substrate 70 are electrically connected in a state where the flexible cable 100 (the inner diameter-side inclined section 104) is sandwiched between the connecting member 80 and the outer peripheral surface 42a, and then the connecting member 80 is fixed to the recessed section 42. According to the above-described configuration, the flexible cable 100 is sandwiched between the connecting member 80 and the outer peripheral surface 42a of the recessed section 42 to be positioned and fixed, and at the same time, the inner diameter-side inclined section 104 is prevented from being bent to the outer diameter side. In the following description, a part of the flexible cable 100, the part passing through the inner peripheral surface side of the main printed circuit board 70 and the guide recess 85 of the connecting member 80, is referred to as the passage section 105.

At a position between the passage section 105 and the mounting section 107 which is electrically connected to the main printed circuit board 70, the length adjusting section 106 formed by bending the flexible cable 100 toward the outer diameter side is disposed.

Figure 6:
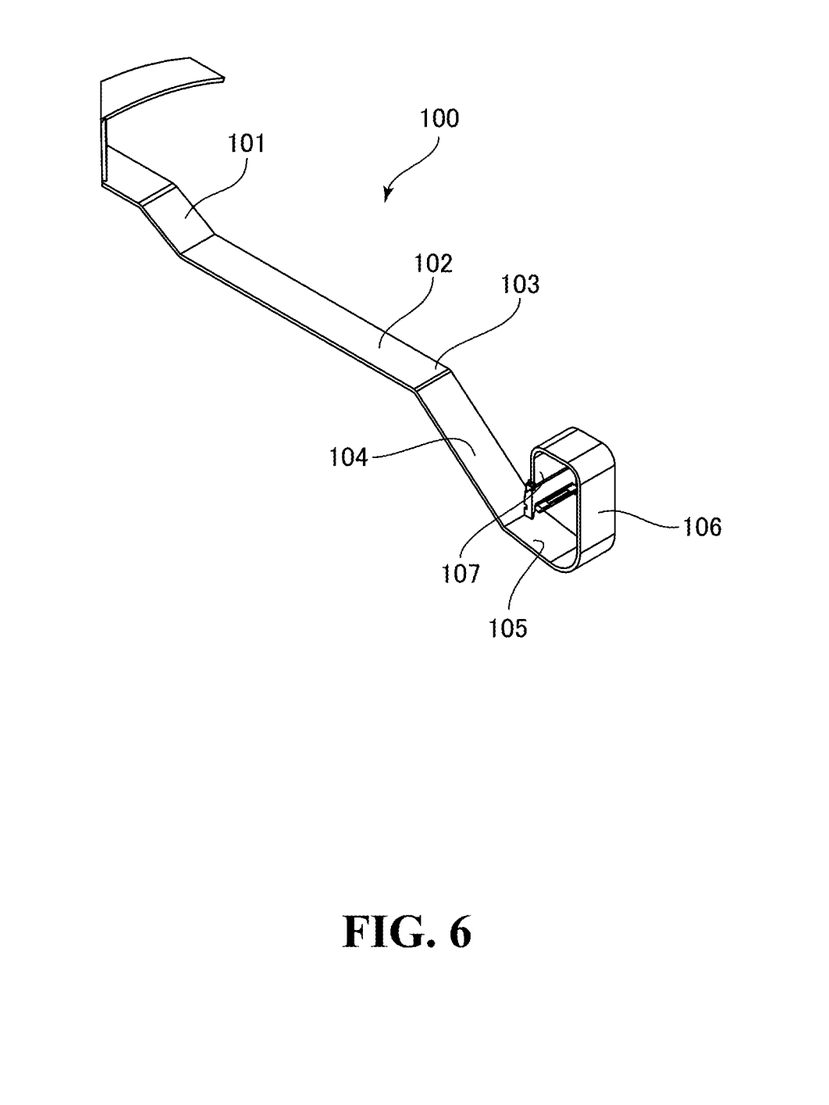
FIG. 6 is a perspective view illustrating a configuration of a flexible cable provided to the lens barrel illustrated in FIG. 1.

FIG. 6 is a perspective view illustrating a configuration of the flexible cable 100. The flexible cable 100 is a cable or a printed circuit board easily deformed such as bending (having flexibility), and it corresponds to a flat electric conductor such as, for example, FFC (flexible flat cable) or FPC (Flexible printed circuits). However, a covered wire or the like covered with an insulating member, other than the flat electric conductor, may also correspond to the cable member. The flexible cable 100 has flexibility, so that it can be laid along the guide groove 21 to be described later or it can be bent toward the outer peripheral surface 42a. Note that the flexible cable 100 corresponds to a cable member. Further, the number of the flexible cable 100 is not limited to one, and the number may be two or more.

Further, the flexible cable 100 is provided with the one end-side inclined section 101, the groove disposition section 102, the guide hole passage section 103, the inner diameter-side inclined section 104, the passage section 105, the length adjusting section 106, and the mounting section 107 as described above. On the other hand, the auxiliary printed circuit board 110 illustrated in FIG. 4 is a rigid printed circuit board which cannot be easily deformed such as bending. However, the auxiliary printed circuit board 110 may also employ a printed circuit board having flexibility such as FPC.

In the lens barrel 10 having the configuration as described above, the one end side of the flexible cable 100 is mounted on the auxiliary substrate 110, the flexible cable 100 is bent, from the mounted position, toward the inner diameter side by the pressing barrel 30, and this part corresponds to the one end-side inclined section 101. Further, the groove disposition section 102 of the flexible cable 100 is disposed inside the guide groove 21. At the groove disposition section 102, the flexible cable 100 is in a state where the flexible cable 100 is not brought into contact with the rotary frame 50 and the rotary cover 60. With further proximity to the other end side along the flexible cable 100, the flexible cable 100 approaches the guide hole passage section 103, and passes through the guide hole 44 of the image-side stationary barrel 40.

With further proximity to the other end side of the flexible cable 100, the flexible cable 100 reaches the inner diameter-side inclined section 104 which is bent toward the inner diameter side so as to be directed from the vicinity of the guide hole 44 to the outer peripheral surface 42a of the recessed section 42. With further proximity to the other end side of the flexible cable 100 from the inner diameter-side inclined section 104, the flexible cable 100 reaches the passage section 105 that passes through the inner peripheral surface of the main printed circuit board 70 and further passes through the guide recess 85 of the connecting member 80 in a state of being brought into contact with the outer peripheral surface 42a of the recessed section 42.

With further proximity to the other end side of the flexible cable 100 from the passage section 105, the flexible cable 100 reaches the length adjusting section 106 that is bent toward the outer diameter side. By the length adjusting section 106, it is possible to perform length adjustment of the flexible cable 100. Specifically, when the length of the flexible cable 100 is sufficiently long, the length of the length adjusting section 106 also becomes long, and in this case, the flexible cable 100 is bent so that a curvature radius of the length adjusting section 106 becomes large, or the length adjusting section 106 is bent so as to form a substantially M shape, for example, when it is seen from a side. On the other hand, when the length of the flexible cable 100 is not so long, the length of the length adjusting section 106 becomes shorter than the above-described case, and the flexible cable 100 is bent so that the curvature radius of the length adjusting section 106 becomes small, for example.

With the use of the length adjusting section 106, even if there is a margin in the length of the flexible cable 100, it becomes possible to suppress occurrence of bending or bulging toward the outer diameter side.

Note that on the other diameter side of the length adjusting section 106, a cylindrical body that rotates or slides such as the rotary cover 60, is not disposed to face the flexible cable 100. Therefore, even if the length adjusting section 106 protrudes greatly toward the outer diameter side, the length adjusting section 106 is set so as no to slide with the cylindrical body that rotates or slides. With further proximity to the other end side of the flexible cable 100 from the length adjusting section 106 as described above, the flexible cable 100 reaches one end portion thereof, and the one end portion corresponds to the mounting section 107 which is mounted on the main substrate 70.

[Regarding Effects]

The lens barrel 10 configured as described above and the interchangeable lens camera 1 correspond to the lens barrel 10 which is attached to the camera main body 2, the lens barrel 10 including: the image-side stationary barrel 40 (the stationary barrel) having the object-side flange section 41 (and/or the image-side flange section 43; the large-diameter section) and the recessed section 42 which is recessed further toward the inner diameter side than the object-side flange section 41 (and/or the image-side flange section 43; the large-diameter section); the main printed circuit board 70 (the printed circuit board) attached so that at least a part thereof is disposed along the outer peripheral surface 42a of the image-side stationary barrel 40 (the stationary barrel); the rotary frame 50 (the movable barrel) and the rotary cover 60 (the movable barrel) moving relative to the image-side stationary barrel 40 (the stationary barrel); and the mounting section 107 having flexibility which allows to be deformed, and mounted on the main printed circuit board 70 (the printed circuit board). Further, the lens barrel 10 includes the flexible cable 100 (the cable member) provided with the passage section 105 which passes between the main printed circuit board 70 (the printed circuit board) and the image-side stationary barrel 40 (the stationary barrel).

According to the configuration as described above, the flexible cable 100 includes the passage section 105, and the passage section 105 passes between the main printed circuit board 70 (the printed circuit board) and the image-side stationary barrel 40 (the stationary barrel), so that at the passage section 105, the movement of the flexible cable 100 (the cable member) toward the rotary frame 50 side (the movable barrel side) and the rotary cover 60 side (the movable barrel side) on the outer diameter side, is suppressed. For this reason, it becomes possible to satisfactorily guide the cable member with respect to the main printed circuit board 70 (the printed circuit board) disposed inside the lens barrel 10 while suppressing an increase in the number of parts. Further, it becomes possible to prevent the flexible cable 100 (the cable member) from being brought into contact with the rotary frame 50 (the movable barrel) and the rotary cover 60 (the movable barrel). Further, it is possible to prevent the force in a pull-out direction from being applied the main printed circuit board 70 (the printed circuit board) and the flexible cable 100 (the cable member).

Further, in the present embodiment, the main printed circuit board 70 (the printed circuit board) is attached to the recessed section 42 of the image-side stationary barrel 40 (the stationary barrel). For this reason, when compared to a case where the main printed circuit board 70 is not attached to the recessed section 42, it becomes possible to reduce a diameter of the lens barrel 10.

Further, in the present embodiment, the main printed circuit board 70 (the printed circuit board) is attached to the image-side stationary barrel 40 (the stationary barrel) via the connecting member 80. Along with this, the connecting member 80 has the guide recess 85 through which the passage section 105 of the flexible cable 100 (the cable member) is passed.

For this reason, by making the flexible cable 100 (the cable member) pass through the guide recess 85, it becomes possible to prevent the interference between the connecting member 80 and the flexible cable 100 (the cable member). Further, by pressing the flexible member 100 (the cable member) with the use of the connecting member 80, it becomes possible to suppress movement of the flexible cable 100 (the cable member) toward the rotary frame 50 side (the movable barrel side) and the rotary cover 60 side (the movable barrel side) on the outer diameter side.

Further, in the present embodiment, the flexible cable 100 (the cable member) is provided with the inner diameter-side inclined section 104 (the inclined section) that comes close to the outer peripheral surface 42a of the image-side stationary barrel 40 (the stationary barrel) with proximity to the passage section 105 from the object-side flange section 41 (and/or the image-side flange section 43; the large-diameter section).

For this reason, with proximity to the passage section 105 from the guide hole passage section 103 along the flexible cable 100 (the cable member), the flexible cable 100 (the cable member) grows distance from the rotary frame 50 (the movable barrel) and the rotary cover 60 (the movable barrel) on the outer diameter side, so that it becomes possible to satisfactorily prevent the flexible cable 100 (the cable member) from being brought into contact with these movable barrels.

Further, in the present embodiment, in the image-side stationary barrel 40 (the stationary barrel), on the side separated from the recessed section 42, the guide groove 21 that guides the flexible cable 100 (the cable member) is provided, and the groove disposition section 102 of the flexible cable 100 (the cable member) is disposed in the guide groove 21.

By disposing the one end-side inclined section 101 in the guide groove 21 as described above, it becomes possible to prevent the flexible cable 100 (the cable member) from being interfered with the rotary frame 50 (the movable barrel) and the rotary cover 60 (the movable barrel) on the outer diameter side.

Further, in the present embodiment, the pressing barrel 30 is attached on the outer diameter side of the image-side stationary barrel 40 (the stationary barrel). Further, the pressing barrel 30 is disposed on the other end side separated from the recessed section 42, of the guide groove 21, and the flexible cable 100 (the cable member) is guided to enter the guide groove 21 by the pressing barrel 30.

For this reason, the flexible cable 100 (the cable member) can be satisfactorily guided to enter the guide groove 21. Further, the flexible cable 100 (the cable member) can be prevented from being protruded toward the outer diameter side.

Further, in the present embodiment, the object-side flange section 41 (the large-diameter section) is provided on the side separated further from the camera main body 2 than the recessed section 42. Further, in the flexible cable 100 (the cable member), the length adjusting section 106 is provided at the portion between the mounting section 107 and the passage section 105, and the length adjusting section 106 gives, to the passage section 105, the biasing force in the direction in which the passage section 105 is separated from the object-side flange section 41 (the large-diameter section).

For this reason, because of the spring characteristic possessed by the length adjusting section 106, the passage section 105 is pulled in the direction of being separated from the object-side flange section 41 (the large-diameter section), resulting in that it becomes possible to prevent the inner diameter-side inclined section 104 from being bent so as to protrude toward the outer diameter side.

Further, the interchangeable lens camera 1 according to the present embodiment includes the above-described lens barrel 10, and the camera main body 2 to which the lens barrel 10 is attached. Accordingly, also in the interchangeable lens camera 1, the movement of the flexible cable 100 (the cable member) toward the rotary frame 50 side (the movable barrel side) and the rotary cover 60 side (the movable barrel side) on the outer diameter side, is suppressed by the passage section 105. For this reason, it becomes possible to satisfactorily guide the cable member with respect to the main printed circuit board 70 (the printed circuit board) disposed inside the lens barrel 10 while suppressing an increase in the number of parts. Further, it becomes possible to prevent the flexible cable 100 (the cable member) from being brought into contact with the rotary frame 50 (the movable barrel) and the rotary cover 60 (the movable barrel). Further, it is possible to prevent the force in a pull-out direction from being applied to the main printed circuit board 70 (the printed circuit board) and the flexible cable 100 (the cable member).

MODIFIED EXAMPLE

Although one embodiment of the present invention has been described above, the present invention is not limited to this, and can be modified in various ways. The modified example will be described hereinbelow.

Figure 7:
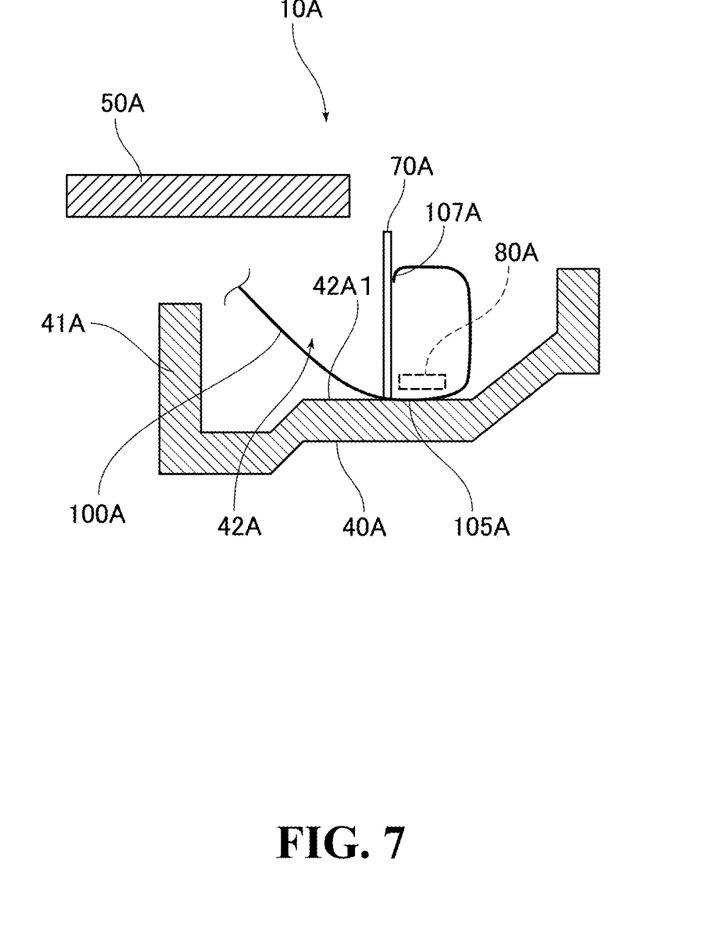
FIG. 7 is a view illustrating an outline of a lens barrel according to a modified example of the present invention.

In the above-described embodiment, the flexible cable 100 corresponding to the cable member extends from the auxiliary substrate 110 toward the main printed circuit board 70. However, the flexible cable is not limited to have such a configuration. Specifically, any configuration may be employed as long it is a configuration as illustrated in FIG. 7. Note that a lens barrel 10A illustrated in FIG. 7 includes a stationary barrel 40A like the image-side stationary barrel 40, and the stationary barrel 40A includes a large-diameter section 41A like the object-side flange section 41 and a recessed section 42A. Further, a printed circuit board 70A is attached so that at least a part thereof is disposed along an outer peripheral surface 42A1 of the stationary barrel 40A. Further, a movable barrel 50A is disposed further on the outer diameter side than the stationary barrel 40A, and it moves relative to the stationary barrel 40A. Further, a cable member 100A has flexibility which allows to be deformed, the cable member 100A including a mounting section 107A which is mounted on the printed circuit board 70A, and including a passage section 105A which passes between the printed circuit boarde 70A and the stationary barrel 40A. Further, the lens barrel 10A may include a connecting member 80A which is similar to the connecting member 80.

Further, in the above-described embodiment, it is set that the lens barrel 10 is attached to an imaging device such as the camera main body 2, and the interchangeable lens camera 1 is configured when the lens barrel 10 is attached to the camera main body 2. However, the lens barrel 10 may be attached to a camera main body which cannot perform interchange of lens. Further, the lens barrel 10 may also be attached to a different optical device such as a projecting device like a projector, for example.

Further, the above-described embodiment describes the image-side stationary barrel 40 as the stationary barrel. However, the stationary barrel is not limited to the image-side stationary barrel 40. For example, it is also possible to provide a stationary barrel corresponding to the object-side stationary barrel 20 on the camera main body 2 side, in the configuration illustrated in FIG. 1 and FIG. 2.

Further, the above-described embodiment describes the rotary frame 50 and the rotary cover 60 as the movable barrels. However, the movable barrels are not limited to the rotary frame 50 and the rotary cover 60, and a different cylindrical body that moves, may be set to the movable barrel.

Further, in the above-described embodiment, the rotary frame 50 and the rotary cover 60 corresponding to the movable barrels are designed to rotate. However, the rotary frame 50 and the rotary cover 60 may be configured to slide along the optical axis A1 direction. Further, it is also possible that a cylindrical body (including a frame-shaped member) that performs only sliding, instead of the rotary frame 50 and the rotary cover 60, is set to the movable barrel.

Further, in the above-described embodiment, the lens barrel 10 includes the connecting member 80, and the main printed circuit board 70 (the printed circuit board) is attached to the outer peripheral surface 42a of the recessed section 42 via the connecting member 80. However, the lens barrel 10 may also employ a configuration of omitting the connecting member 80. For example, there is provided a protruding part protruding in the radial direction from the outer peripheral surface 42a. Further, it is possible to design such that a through hole along the optical axis A1 direction is provided to the protruding part, and by inserting a screw or the like into the through hole, for example, the main printed circuit board 70 (the printed circuit board) is fixed to the recessed section 42 via the protruding part.

Further, in the above-described embodiment, the rotary frame 50 and the rotary cover 60 corresponding to the movable barrels are disposed further on the outer diameter side than the image-side stationary barrel 40 that corresponds to the stationary barrel. However, the movable barrels may employ a configuration in which they are disposed further on the inner diameter side than the stationary barrel. In this case, at both end sides in the optical axis A1 direction of the movable barrels, protruding support parts protruding from the outer peripheral surface of the stationary barrel to the outer diameter side are provided. Further, by the protruding support parts, the cable member is supported in a state where the cable member extends further on the outer diameter side than the movable barrels. With the configuration as described above, it becomes possible to support the cable member further on the outer diameter side than the movable barrels, in a state where the cable member is not brought into contact with the movable barrels.

The invention claimed is:

1. A lens barrel attached to a camera main body, the lens barrel comprising:
   a stationary barrel having a large-diameter section and a recessed section which is recessed further toward an inner diameter side than the large-diameter section, the large-diameter section and the recessed section being along an optical axis direction;

a substrate attached so that at least a part thereof is disposed along an outer peripheral surface of the stationary barrel;

movable barrels moving relative to the stationary barrel, the movable barrels being arranged on the outer periphery of the stationary barrel and on the large-diameter section side than the substrate in the optical axis direction; and a cable member having flexibility which allows the cable member to deform flexibly, the cable member including a mounting section which is mounted on the substrate, including a passage section which passes between the substrate and the stationary barrel, and including a length adjusting section which is provided between the mounting section and the passage section and on the recessed section side with respect to the substrate in the optical axis direction, wherein at least a part of the cable member located on the large-diameter section side than the passage section in the optical axis direction is located between the stationary barrel and the movable barrel, wherein the length adjusting section gives, to the passage section, biasing force in a direction in which the passage section is separated from the large-diameter section along the optical axis direction.

2. The lens barrel according to claim 1, wherein
the substrate is attached to the recessed section of the stationary barrel, and
the mounting section is mounted on the surface of the substrate on the side away from the large-diameter section in the optical axis direction so that the mounting section faces the inner diameter side of the recessed section.

3. The lens barrel according to claim 1, wherein:
the substrate is attached to the stationary barrel via a connecting member; and
the connecting member has a guide recess in a recessed shape through which the passage section of the cable member is passed.

4. The lens barrel according to claim 1, wherein
the cable member is provided with an inclined section that approaches an outer peripheral surface of the recessed section with proximity to the passage section from the large-diameter section.

5. The lens barrel according to claim 4, wherein
an outer peripheral surface of the large-diameter section is provided with a guide groove which guides the cable member from the recessed section side toward the large-diameter section side, and a groove disposition section of the cable member is disposed in the guide groove.

6. The lens barrel according to claim 5, wherein:
a pressing barrel is attached to the outer diameter side of the stationary barrel;
the pressing barrel is disposed on the opposite side of the recessed section with respect to the movable barrels; and
the cable member is guided to enter the guide groove by the pressing barrel.

7. The lens barrel according to claim 1, wherein:
the large-diameter section is provided on a side separated further from the camera main body than the recessed section; and
a length adjusting section is provided at a portion between the mounting section and the passage section of the cable member.

8. An interchangeable lens camera, comprising:
the lens barrel according to claim 1; and
a camera main body to which the lens barrel is attached.

* * * * *